(12) United States Patent
Kubota et al.

(10) Patent No.: US 12,015,362 B2
(45) Date of Patent: Jun. 18, 2024

(54) HEAT PUMP APPARATUS, AIR CONDITIONER, AND REFRIGERATOR

(71) Applicant: Mitsubishi Electric Corporation, Tokyo (JP)

(72) Inventors: Shunsuke Kubota, Tokyo (JP); Keisuke Uemura, Tokyo (JP); Takashi Yamakawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 345 days.

(21) Appl. No.: 17/599,873

(22) PCT Filed: May 28, 2019

(86) PCT No.: PCT/JP2019/021057
§ 371 (c)(1),
(2) Date: Sep. 29, 2021

(87) PCT Pub. No.: WO2020/240686
PCT Pub. Date: Dec. 3, 2020

(65) Prior Publication Data
US 2022/0209701 A1 Jun. 30, 2022

(51) Int. Cl.
*H02P 23/14* (2006.01)
*F25B 49/02* (2006.01)
*H02P 27/08* (2006.01)

(52) U.S. Cl.
CPC .......... *H02P 27/08* (2013.01); *F25B 49/022* (2013.01); *H02P 23/14* (2013.01); *F25B 2600/021* (2013.01)

(58) Field of Classification Search
CPC ........ H02P 27/08; H02P 23/14; F25B 49/022; F25B 2600/021
See application file for complete search history.

(56) References Cited

U.S. PATENT DOCUMENTS 9,263,984 B2 2/2016 Hatakeyama et al.
9,322,587 B2 * 4/2016 Shinomoto ............. F25B 30/02
(Continued)

FOREIGN PATENT DOCUMENTS

CN 105209835 A 12/2015
JP S60-068341 U 5/1985
(Continued)

OTHER PUBLICATIONS

Office Action dated Jun. 30, 2023 issued in corresponding Chinese Patent Application No. 201980096681.7 (and English machine translation).
(Continued)

*Primary Examiner* — Rina I Duda
(74) *Attorney, Agent, or Firm* — Posz Law Group, PLC (57) ABSTRACT

A heat pump apparatus includes: a compression mechanism that compresses a refrigerant; a motor that drives the compression mechanism; an inverter that applies a voltage to the motor; and an inverter control unit that generates a drive signal for driving the inverter, based on a carrier signal, in which the inverter control unit periodically changes a carrier frequency of the carrier signal in a heating operation mode in which the refrigerant is heated, and generates the drive signal such that a period of time during which a voltage represented as a real vector is applied to the motor is kept constant regardless of the changed carrier frequency.

15 Claims, 11 Drawing Sheets

(56) References Cited

U.S. PATENT DOCUMENTS

| | | | |
|---|---|---|---|
| 2005/0105308 A1 | 5/2005 | Urakabe et al. | |
| 2011/0227522 A1* | 9/2011 | Shinomoto | H02M 1/4225 |
| | | | 318/400.29 |
| 2012/0111043 A1* | 5/2012 | Hatakeyama | H02M 7/53875 |
| | | | 62/190 |
| 2014/0174118 A1 | 6/2014 | Shinomoto et al. | |
| 2014/0232365 A1 | 8/2014 | Sasaki et al. | |
| 2014/0338379 A1* | 11/2014 | Hatakeyama | F25B 31/02 |
| | | | 62/126 |
| 2016/0146523 A1* | 5/2016 | Hatakeyama | F25B 49/025 |
| | | | 62/324.6 |
| 2017/0201186 A1* | 7/2017 | Yuasa | H02M 1/14 |

FOREIGN PATENT DOCUMENTS

| | | |
|---|---|---|
| JP | 2005-110348 A | 4/2005 |
| JP | 2010-178449 A | 8/2010 |
| JP | 2011-038689 A | 2/2011 |
| JP | 2014-161190 A | 9/2014 |
| WO | 2012/172684 A1 | 12/2012 |
| WO | 2014/188566 A1 | 11/2014 |

OTHER PUBLICATIONS

International Search Report dated Aug. 20, 2019, issued in corresponding International Application No. PCT/JP2019/021057 (and English Machine Translation).

Office Action dated Nov. 18, 2022 issued in corresponding Chinese Patent Application No. 201980096681.7 (and English machine translation).

* cited by examiner

HEAT PUMP APPARATUS, AIR CONDITIONER, AND REFRIGERATOR

CROSS REFERENCE TO RELATED APPLICATION

This application is a U.S. National Stage Application of International Patent No. PCT/JP2019/021057 filed on May 28, 2019, the disclosure of which is incorporated herein by reference.

TECHNICAL FIELD

The present invention relates to a heat pump apparatus, an air conditioner, and a refrigerator, the heat pump apparatus including a compressor.

BACKGROUND

Conventionally, in an air conditioner or the like, a refrigerant stays inside a compressor having a large heat capacity, due to a decrease in the temperature of the refrigerant while the compressor is not in operation. This is called refrigerant stagnation. Various approaches have been studied as methods for eliminating stagnation of a refrigerant and smoothing the lubricating action of the refrigerant. For example, Patent Literature 1 discloses a method for supplying a high-frequency low voltage to a compressor while heating operation is not being performed. Furthermore, Patent Literature 1 discloses combining high-frequency carriers having a plurality of frequencies of 10 kHz or less, which are lower in frequency than other high-frequency carriers, to reduce a resultant carrier frequency to an inaudible range, so that loss in an inverter to be caused by the high-frequency carriers are reduced and the electromagnetic sound of the compressor is reduced. Thus, the method disclosed in Patent Literature 1 achieves both a reduction in power consumption and noise reduction.

PATENT LITERATURE

Patent Literature 1: WO 2012/172684 A

The resultant carrier frequency is lowered in the method disclosed in Patent Literature 1. However, since the carriers are high-frequency carriers, the method disclosed in Patent Literature 1 has a problem with the peak of a high-frequency component of electrical noise. In addition, Patent Literature 1 has a problem in that there occurs an instantaneous change in output power. The instantaneous change in output power is likely to cause an instantaneous noise peak.

SUMMARY

The present invention has been made in view of the above, and an object of the present invention is to obtain a heat pump apparatus capable of preventing or reducing an instantaneous change in output power and electrical noise.

In order to solve the above-described problem and achieve the object, a heat pump apparatus according to the present invention includes a compression mechanism to compress a refrigerant, a motor to drive the compression mechanism, an inverter to apply a voltage to the motor, and an inverter control unit to generate a drive signal for driving the inverter based on a carrier signal. The inverter control unit periodically changes a carrier frequency of the carrier signal in a heating operation mode in which the refrigerant is heated, and generates the drive signal such that a period of time during which a voltage represented as a real vector is applied to the motor is kept constant regardless of the changed carrier frequency.

A heat pump apparatus according to the present invention has an effect of preventing or reducing an instantaneous change in output power and electrical noise.

DETAILED DESCRIPTION

Hereinafter, heat pump apparatuses, air conditioners, and refrigerators according to embodiments of the present invention will be described in detail with reference to the drawings. Note that the present invention is not limited to the embodiments.

First Embodiment

Figure 1:
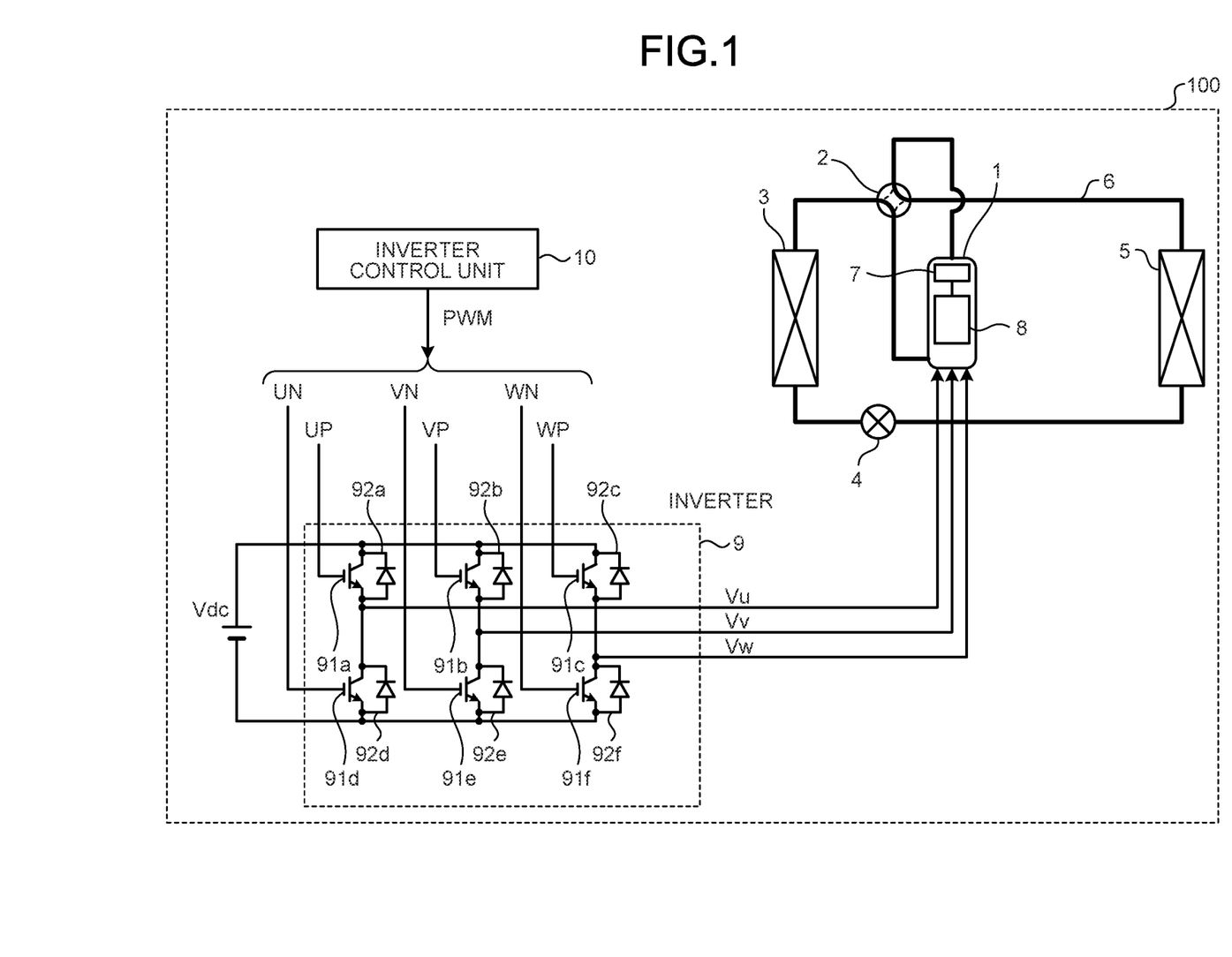
FIG. 1 is a diagram illustrating a configuration example of a heat pump apparatus according to a first embodiment.

FIG. 1 is a diagram illustrating a configuration example of a heat pump apparatus 100 according to a first embodiment. The heat pump apparatus 100 includes a compressor 1, a four-way valve 2, a heat exchanger 3, an expansion mechanism 4, a heat exchanger 5, an inverter 9, and an inverter control unit 10. The compressor 1, the four-way valve 2, the heat exchanger 3, the expansion mechanism 4, and the heat exchanger 5 are connected in sequence via a refrigerant pipe 6 to form a refrigeration cycle. The compressor 1 includes a compression mechanism 7 and a motor 8. The compression mechanism 7 compresses a refrigerant. The motor 8 causes the compression mechanism 7 to operate. The motor 8 is a three-phase motor having windings for three phases of a U-phase, a V-phase, and a W-phase. The heat pump apparatus 100 is provided in an air conditioner, a refrigerator, or the like.

The inverter 9 provides voltage to the motor 8 to drive the motor 8. Furthermore, the inverter 9 is electrically connected to the motor 8. The inverter 9 applies voltages Vu, Vv, and Vw to the U-phase, V-phase, and W-phase windings of the motor 8, respectively.

The inverter control unit 10 generates a pulse-width modulation (PWM) signal, and drives the inverter 9. The PWM signal is also referred to as a drive signal. The inverter 9 and the inverter control unit 10 are electrically connected.

The inverter 9 includes switching elements 91a to 91f and freewheeling diodes 92a to 92f. The inverter 9 converts a supplied bus voltage Vdc into the voltages Vu, Vv, and Vw, which are three-phase AC voltages, and applies the voltages Vu, Vv, and Vw to the U-phase, V-phase, and W-phase windings of the motor 8, respectively. Furthermore, three pairs of switching elements connected in series, that is, a pair of switching elements 91a and 91d, a pair of switching elements 91b and 91e, and a pair of switching elements 91c and 91f are connected in parallel in the inverter 9. The freewheeling diodes 92a to 92f are connected in parallel to the switching elements 91a to 91f, respectively. The inverter 9 uses PWM signals UP, VP, WP, UN, VN, and WN sent from the inverter control unit 10 to drive the respective corresponding switching elements. As a result, the inverter 9 generates the three-phase voltages Vu, Vv, and Vw, and applies the three-phase voltages Vu, Vv, and Vw to the U-phase, V-phase, and W-phase windings of the motor 8, respectively. The PWM signal UP drives the switching element 91a. The PWM signal VP drives the switching element 91b. The PWM signal WP drives the switching element 91c. The PWM signal UN drives the switching element 91d. The PWM signal VN drives the switching element 91e. The PWM signal WN drives the switching element 91f.

The inverter control unit 10 generates and outputs the PWM signals UP, VP, WP, UN, VN, and WN so as to rotationally drive the motor 8 in a normal operation mode. Furthermore, the inverter control unit 10 heats the compressor 1 without rotationally driving the motor 8, by passing a high-frequency current that the motor 8 cannot follow in a heating operation mode in which the compressor 1 is heated. In the heating operation mode, the compressor 1 discharges the refrigerant by warming and vaporizing a liquid refrigerant retained in the compressor 1. The inverter control unit 10 estimates the amount of the liquid refrigerant retained in the compressor 1 based on an outside air temperature and a temperature of the compressor 1, and shifts to the heating operation mode when the refrigerant stagnates. The inverter control unit 10 holds information indicating the state of the operation mode of the heat pump apparatus 100. The information indicating the state of the operation mode refers to information on the state of either the normal operation mode or the heating operation mode.

Figure 2:
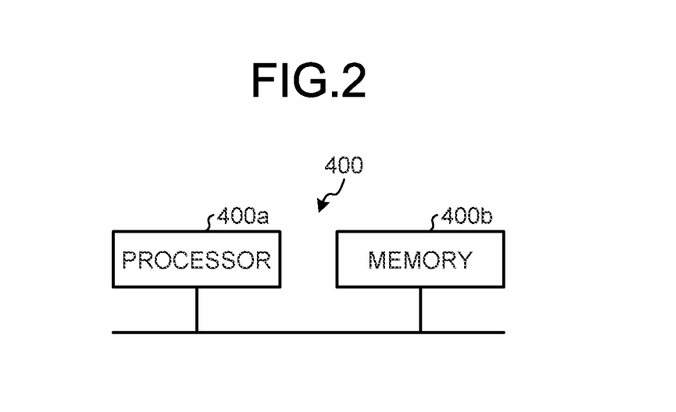
FIG. 2 is a diagram illustrating control circuitry according to the first embodiment.

The inverter control unit 10 is, for example, a microcomputer, and is implemented by processing circuitry that is electronic circuitry that implements each processing. The present processing circuitry may be dedicated hardware or control circuitry including a memory and a central processing unit (CPU) that executes a program stored in the memory. Here, the memory corresponds to, for example, a nonvolatile or volatile semiconductor memory, such as a random access memory (RAM), a read only memory (ROM), or a flash memory, a magnetic disk, or an optical disk. FIG. 2 is a diagram illustrating control circuitry according to the first embodiment. In the case where the present processing circuitry is control circuitry including a CPU, the control circuitry is exemplified by control circuitry 400 with a configuration illustrated in FIG. 2.

As illustrated in FIG. 2, the control circuitry 400 includes a processor 400a that is a CPU, and a memory 400b. In the case where the inverter control unit 10 is implemented by the control circuitry 400 illustrated in FIG. 2, the inverter control unit 10 is implemented by the processor 400a reading and executing a program corresponding to each processing, stored in the memory 400b. In addition, the memory 400b is also used as a temporary memory in each processing to be performed by the processor 400a.

Figure 3:
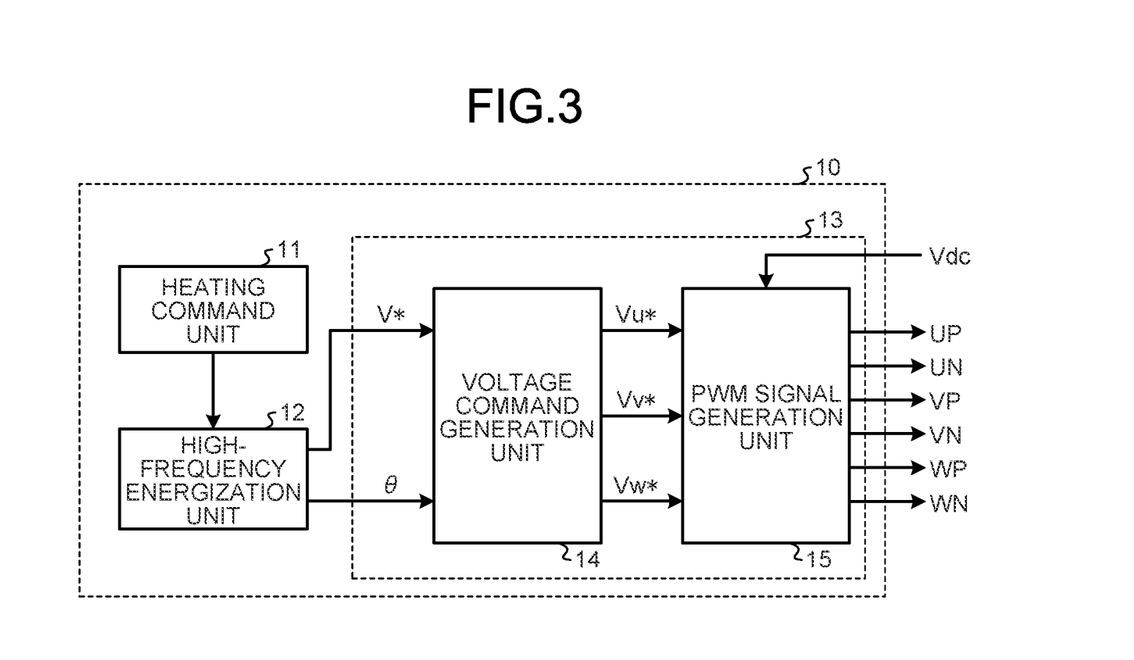
FIG. 3 is a diagram illustrating an inverter control unit according to the first embodiment.

Hereinafter, a description will be given of a control method for efficiently passing a high-frequency current through a motor, which is a method for heating the compressor according to the present invention. FIG. 3 is a diagram illustrating the inverter control unit 10 according to the first embodiment. The inverter control unit 10 includes a heating command unit 11, a high-frequency energization unit 12, and a drive signal generation unit 13. The high-frequency energization unit 12 receives a signal of a necessary heating amount from the heating command unit 11, generates a high-frequency voltage command value V* and a high-frequency phase command θ for generating a high-frequency AC voltage, and outputs signals to the drive signal generation unit 13. The drive signal generation unit 13 includes a voltage command generation unit 14 and a PWM signal generation unit 15. The high-frequency voltage command value V* and the high-frequency phase command θ are input to the voltage command generation unit 14. In addition, the voltage command generation unit 14 generates voltage command values Vu*, Vv*, and Vw*, and outputs the voltage command values Vu*, Vv*, and Vw* to the PWM signal generation unit 15. The PWM signal generation unit 15 receives the voltage command values, generates PWM signals, and outputs the drive signals UP, VP, WP, UN, VN, and WN for driving the inverter 9 to drive the inverter 9.

Figure 4:
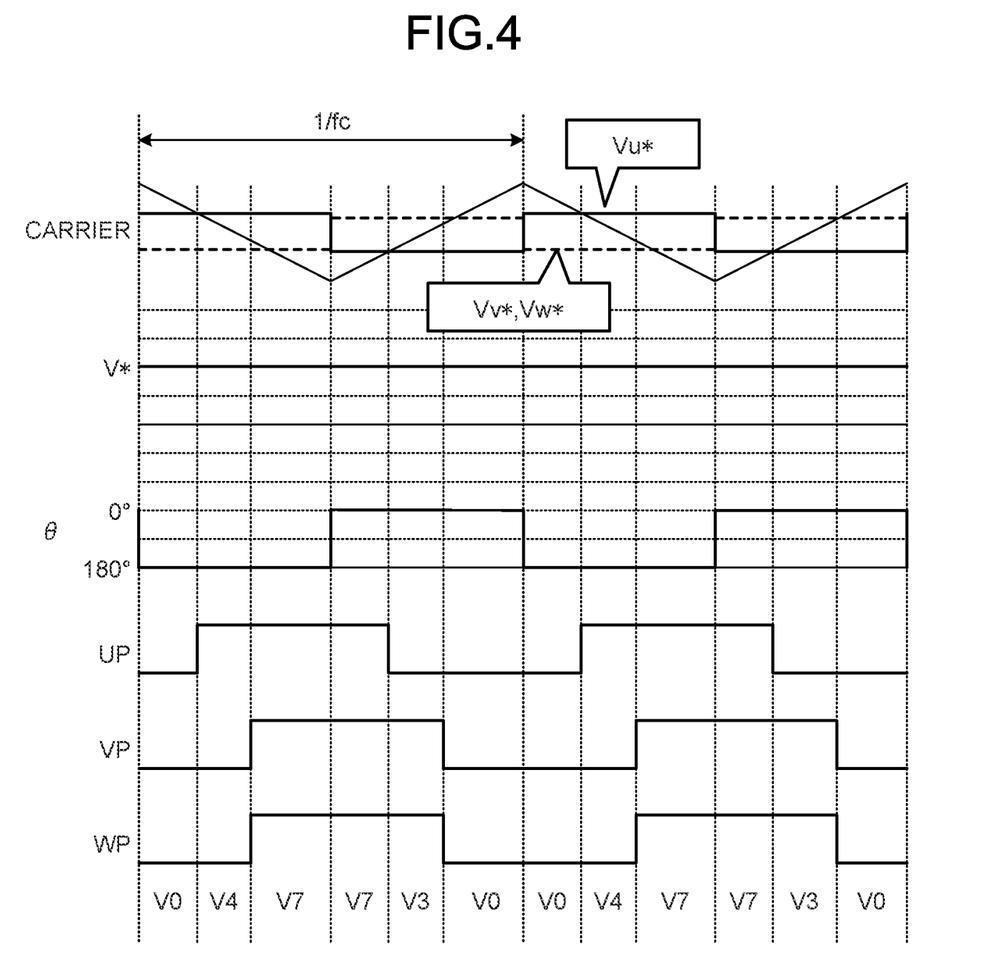
FIG. 4 is a diagram illustrating the relationship between a carrier with a frequency of fc, voltage command values, and drive signals according to the first embodiment.

FIG. 4 is a diagram illustrating the relationship between a carrier with a frequency of fc, the voltage command values, and the drive signals according to the first embodiment. In addition, FIG. 4 illustrates operation to be performed when V* is set to any given value and the output of the high-frequency energization unit 12 is set to 0°. The high-frequency phase command θ switches between 0° and 180° at the timing of the peak or valley of a carrier signal. As a result, the PWM signal generation unit 15 can output PWM signals synchronized with the carrier signal. This operation is for switching between a voltage with a phase difference of 0° with respect to the reference phase and a voltage with a phase difference of 180° with respect to the reference phase. At this time, the voltage vector changes in the order of V0 (UP=VP=WP=0), V4 (UP=1, VP=WP=0), V7 (UP=VP=WP=1), V3 (UP=0, VP=WP=1), V0 (UP=VP=WP=0), . . . . The PWM signal generation unit 15 compares the voltage command values Vu*, Vv*, and Vw* with a carrier signal having a predetermined frequency, and generates the PWM signals UP, VP, WP, UN, VN, and WN based on magnitude relationships between the voltage command values and the carrier signal. The carrier signal having a predetermined frequency is also referred to as a reference signal. Furthermore, although not illustrated in FIG. 4, the PWM signal UN and the PWM signal UP have values with opposite signs, the PWM signal VN and the PWM signal VP have values with opposite signs, and the PWM signal WN and the PWM signal WP have values with opposite signs.

Figure 5:
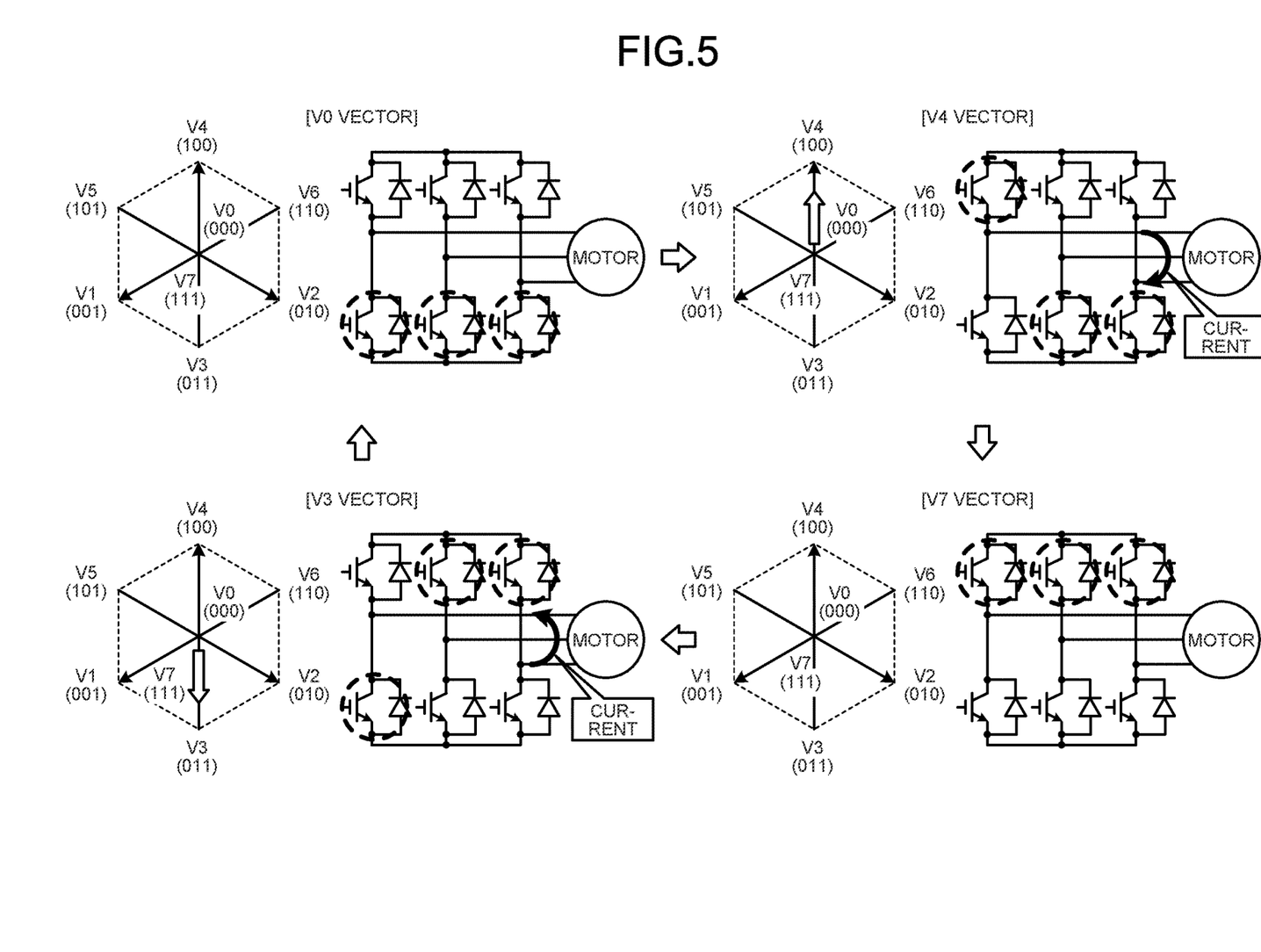
FIG. 5 is a diagram describing changes in a voltage vector illustrated in FIG. 4.

FIG. 5 is a diagram describing changes in the voltage vector illustrated in FIG. 4. The diagram given in FIG. 5 illustrates that switching elements surrounded by broken lines are on, and the other switching elements are off. Here, the rotation direction of thick arrows indicating the order of changes in the voltage vector (the rotation direction of the voltage vector V0→V4→V7→V3→V0 . . . ) is based on the example of FIG. 4. However, the voltage vector may change in reverse order.

As illustrated in FIG. 5, when the V0 vector and the V7 vector are applied, lines of the motor 8 are short-circuited, and no voltage is output. In this case, energy stored in an inductance of the motor 8 flows as a current through the short circuit. In addition, when the V4 vector is applied, a current (current of +Iu) flows in a U-phase direction through the windings of the motor 8 such that the current flows into the motor 8 via the U-phase, and flows out of the motor 8 via the V-phase and the W-phase. When the V3 vector is applied, a current (current of −Iu) flows in a −U-phase direction through the windings of the motor 8 such that the current flows into the motor 8 via the V-phase and the W-phase, and flows out of the motor 8 via the U-phase. That is, when the V4 vector is applied, a current flows through the windings of the motor 8 in the reverse direction with respect to the direction in which a current flows when the V3 vector is applied. In addition, since the voltage vector changes in the order of V0, V4, V7, V3, V0, . . . , the current of +Iu and the current of −Iu alternately flow in the windings of the motor 8. In particular, since the V4 vector and the V3 vector appear during a single carrier period (1/fc) as illustrated in FIG. 4, the inverter 9 can apply an AC voltage synchronized with the carrier frequency fc to the windings of the motor 8.

The V4 vector and the V3 vector are alternately output at a frequency higher than an operating frequency at which the compressor 1 performs compression operation. As a result, torque switches between positive torque and negative torque, so that the torque is offset. Therefore, it is possible to prevent or reduce vibration of the motor. In addition, when the frequency of a high-frequency voltage applied by the inverter 9 is 14 kHz or more, the vibration sound of the iron core of the motor 8 is substantially out of an audible range. This is also effective in reducing noise. For example, due to characteristics of elements to be used for the inverter 9, usable switching frequency is 20 kHz in many cases. Therefore, a switching frequency is set to 14 kHz to 20 kHz. That is, a carrier frequency of 14 kHz to 20 kHz is used. As a result, the vibration sound of the iron core of the motor 8 falls outside the audible range, so that low-noise heating can be performed. In addition, an increase in an inductance component due to the high frequency caused by the application of the high-frequency voltage increases winding impedance. As a result, currents flowing through the windings decrease and copper loss decreases. Meanwhile, iron loss is caused by application of the high-frequency voltage accordingly, so that heating can be effectively performed. Furthermore, since the currents flowing through the windings are small, loss in the inverter 9 is also reduced. Therefore, it is possible to further reduce loss in performing heating. Moreover, when the compressor 1 is a magnet embedded motor, the surface of a rotor where high-frequency magnetic fluxes are interlinked also serves as a heat generating portion. Therefore, a surface of contact with the refrigerant increases, and rapid heating of the compression mechanism 7 is achieved, so that the refrigerant can be efficiently heated.

Figure 6:
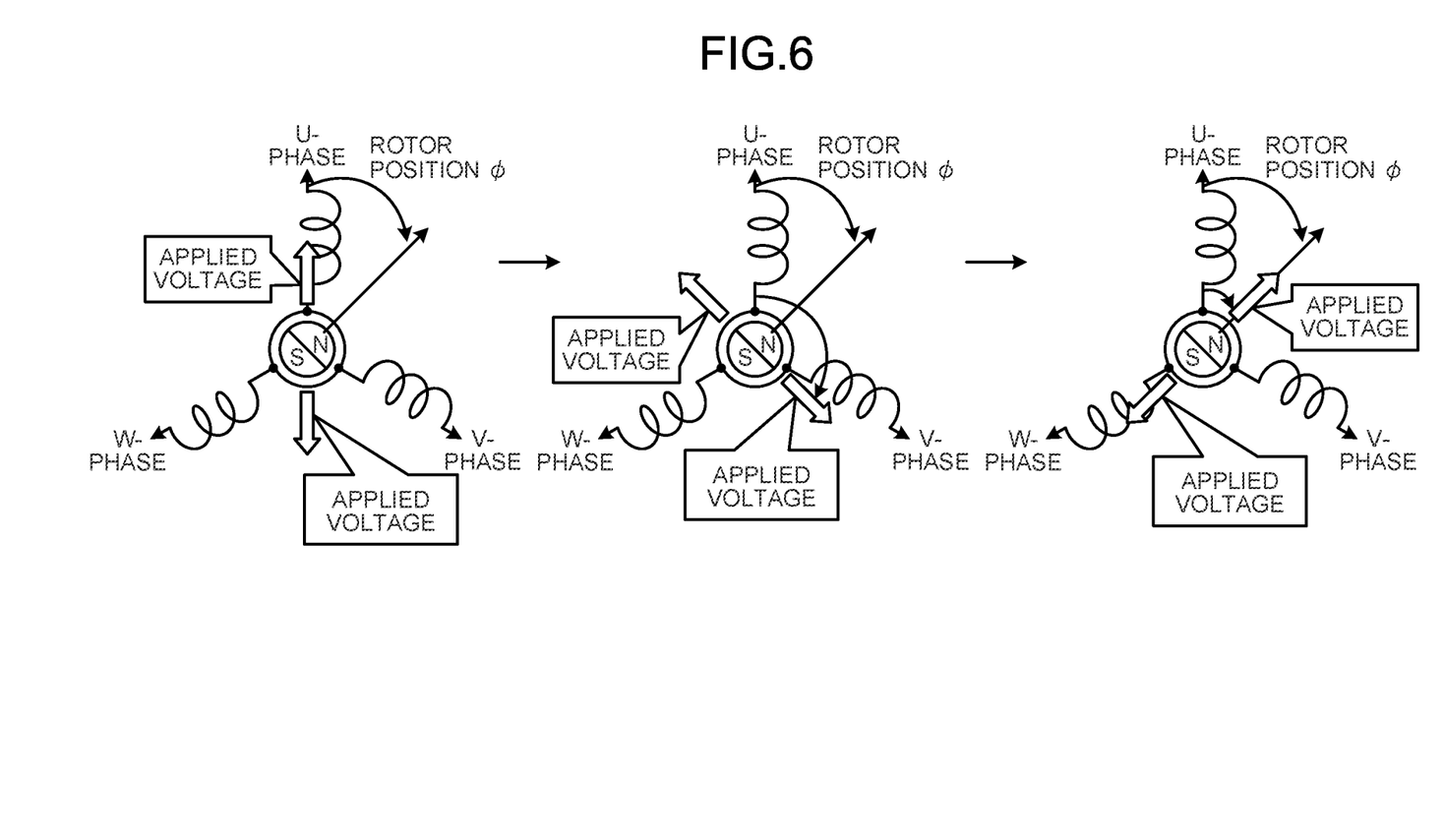
FIG. 6 is a diagram illustrating voltages to be applied when the voltage vector according to the first embodiment is changed over time.

Furthermore, it is possible to avoid uneven heating by shifting the direction of the voltage vector by a desired angle with the lapse of a desired period of time from the operation of alternately outputting the V4 vector and the V3 vector. FIG. 6 is a diagram illustrating voltages to be applied when the voltage vector according to the first embodiment is changed over time. For example, assume that, as illustrated in FIG. 6, pairs of voltage vectors to be output alternately with opposite signs are shifted by 120° in the order of a pair of the vectors V4 and V3, a pair of the vectors V2 and V5, and then a pair of the vectors V1 and V6. The reason why the voltage vectors are shifted is to prevent uneven heating from being caused by variations in the impedance of the windings depending on the position of a rotor, variations in current depending on the position of the rotor, and variations in input power for the motor depending on the position of the rotor in the case where the motor 8 is a magnet embedded motor. In addition, while FIG. 6 illustrates an example in which the voltage vectors are shifted by 120° at desired time intervals, it is also possible to, of course, achieve the same effect by shifting the voltage vectors by 60°. Alternatively, the voltage vectors may be shifted by an angle other than 120° and 60° at desired time intervals.

The high-frequency voltage is applied under the control of the inverter control unit 10 as described above. As a result, it is possible to efficiently heat the compressor 1 with low noise and low power consumption. However, electrical noise may be a problem with use of this control. It is necessary to comply with standards for noise in an air conditioner or a refrigerator, such as the Electrical Appliances and Materials Safety Act or EN 55014-1 in Europe. In this regard, this heating control is performed by use of a high-frequency carrier, and a high-frequency voltage synchronized with the high-frequency carrier is applied in electromagnetic compatibility (EMC) emission. Therefore, a large noise peak may appear at a frequency that is an integral multiple of that of the carrier. In the EMC emission, quasi-peak detection (QP) and average detection (AV) are designated as limit values for the magnitude of the noise amount of each frequency component for each standard, and there is a problem that the EMC standards cannot be satisfied if a noise peak is present in a specific frequency component. In addition, the quasi-peak detection tends to increase as the frequency of appearance of a noise peak increases.

To address this tendency, the carrier frequency is periodically changed from a constant frequency to a variable frequency. As a result, it is possible to change noise characteristics that may cause a plurality of large peaks to appear to noise characteristics that enable peaks to be dispersed over a plurality of frequencies for smoothing. Hereinafter, a method for periodically changing the carrier frequency will be described.

Figure 7:
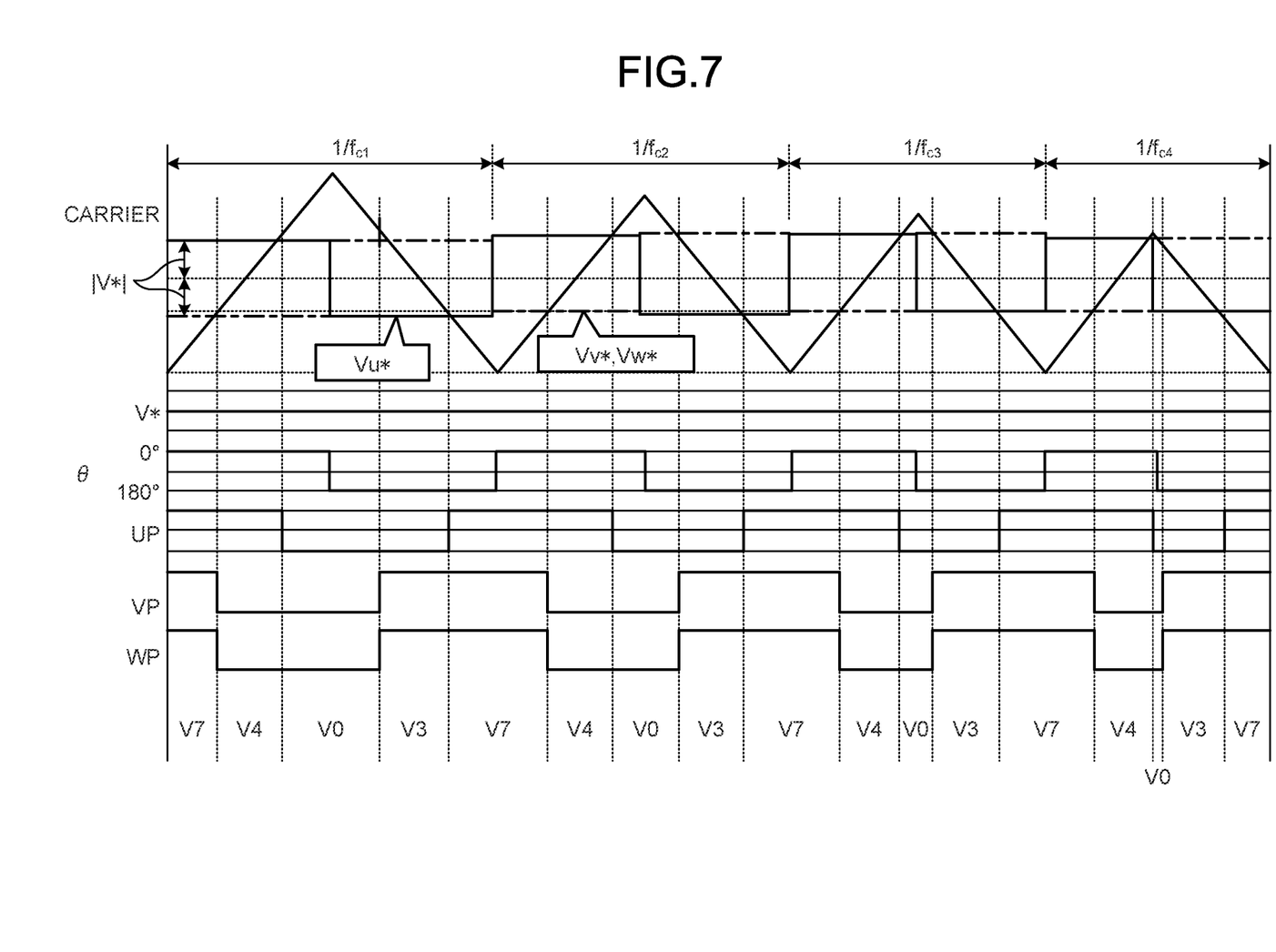
FIG. 7 is a diagram illustrating operation to be performed when a V4 vector and a V3 vector are alternately output on the assumption that the carrier according to the first embodiment is variable.

FIG. 7 is a diagram illustrating operation to be performed when the V4 vector and the V3 vector are alternately output on the assumption that the carrier according to the first embodiment is variable. FIG. 7 illustrates a case where the carrier frequency is changed in the order of $f_{c1}$, $f_{c2}$, $f_{c3}$, and then $f_{c4}$ to shorten a carrier period. A carrier with a carrier frequency of $f_{c1}$, a carrier with a carrier frequency of $f_{c2}$, a carrier with a carrier frequency of $f_{c3}$, and a carrier with a carrier frequency of $f_{c4}$ have the same gradient, and amplitude decreases in the order of $f_{c1}$, $f_{c2}$, $f_{c3}$, and $f_{c4}$. Note that, in FIG. 7, the frequency is switched to the next frequency at the valley of the carrier, but the frequency may be switched at the peak of the carrier. The carrier frequency can be switched from $f_{c1}$ to $f_{c2}$, $f_{c3}$, $f_{c4}$, . . . at a constant gradient by the output of an internal PWM timer in the case of, for example, inverter control by a general microcomputer. Therefore, the carrier just needs to be modulated with a periodic function with a low frequency relative to the amplitude of the carrier. The periodic function may be a sine wave, a triangular wave, or other composite waves.

Alternatively, the frequency may be switched by repetition of the process of setting in sequence a plurality of frequencies described in a table prepared in advance, the table containing a plurality of frequencies within a variable range or a plurality of frequencies that can be set. For example, the table contains a plurality of frequencies described in the order in which the frequencies are set. Alternatively, control may be performed so as to make the frequency variable such that a next frequency is determined at the peak of the carrier, and the frequency is switched to the next frequency at the valley of the carrier. At this time, it is also possible to adopt a method of randomizing frequency values by using random numbers or the like. However, from the viewpoint of electrical noise, it is easier to smooth the peak value of noise by performing the variable control by means of modulation based on a periodic function than by performing the method of randomizing the frequency. Note that the frequency can also be made variable by a method of changing the gradient of the carrier without changing the carrier amplitude.

However, the method of FIG. 7 has a problem in that a change in the amplitude of the carrier causes a change in the phase of the intersection of the voltage command value and the carrier, leading to a deviation from a carrier frequency intended to be variable. It is not desirable, from the viewpoint of improving the EMC emission, that another peak value appears due to the above problem, in spite of noise peak dispersion.

In addition, when the amplitude of the carrier decreases, likelihood decreases in a direction in which the carrier frequency is changed to increase. Furthermore, since transition time is shortened as with that for the V0 vector to be observed while the carrier frequency is set to $f_{c4}$ in FIG. 7, a variable frequency range is narrowed.

When the carrier frequency is increased, the number of values to which the frequency can be changed decreases, so that the variable frequency range is narrowed also in the case where control is performed in which the frequency is made variable by a method of changing the gradient of the carrier without changing the carrier amplitude. This is because there is a limit to a clock frequency forming the carrier and the number of bits of counter output.

Figure 8:
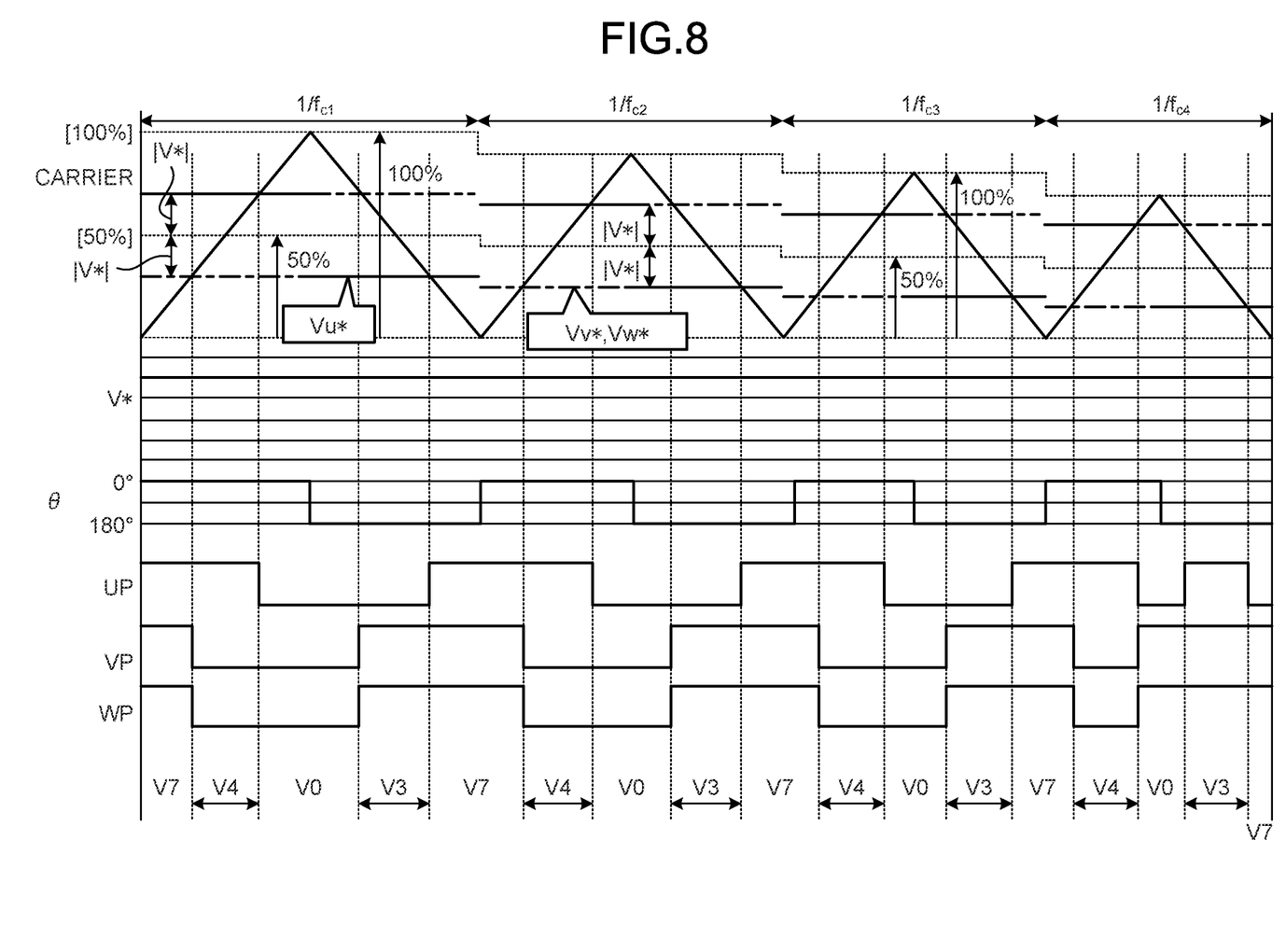
FIG. 8 is another diagram illustrating operation to be performed when the V4 vector and the V3 vector are alternately output on the assumption that the carrier according to the first embodiment is variable.

FIG. 8 is another diagram illustrating operation to be performed when the V4 vector and the V3 vector are alternately output on the assumption that the carrier according to the first embodiment is variable. In the present embodiment, as illustrated in FIG. 8, every time the carrier period is changed, the center value of the carrier amplitude is changed following a change in the carrier amplitude, and the center value of the carrier amplitude is used as a basis for voltage command values with opposite signs for each carrier frequency. Thus, the carrier frequency can be accurately and finely varied in a wide range. FIG. 8 illustrates the carrier amplitude having a center value of 50%. Note that, in the method of FIG. 7, since the center value of the amplitude of the carrier is constant regardless of the period, the amplitude of the carrier decreases as the carrier frequency increases, so that a range in which the carrier frequency can be increased is narrowed as compared with the method of FIG. 8.

In addition, it is possible to keep a period of time constant during which a voltage represented as a real vector is applied, by using the center value of the carrier amplitude as a basis for voltage command values with opposite signs and setting a voltage command value |V*| such that the value of deviation from the center value is kept constant for each carrier as illustrated in FIG. 8. Note that, in FIG. 8, the real vector corresponds to the V4 vector and the V3 vector. A current value depends on a voltage application time period. Therefore, the frequency of the high-frequency wave of a voltage to be applied to the motor 8 and the carrier frequency are variable. It is thus possible to keep currents flowing through the windings of the motor 8 at constant values regardless of frequency even in the case of applying voltages with different frequencies. This stabilizes power to be generated by a change in the carrier frequency and instantaneously applied to the compressor. Thus, for example, it is possible to work out a design such that likelihood is likely to be ensured even in the case where the design is based on power close to 50 W that is the maximum power to be used for heating defined in the Electrical Appliances and Materials Safety Act and the like. This achieves the effect of reducing heating time. In addition, as power increases, the magnitude of an electrical noise amount tends to increase with the increasing power. Therefore, according to the present invention, it is possible to reduce the quasi-peak detection by reducing the peak of power to be instantaneously applied to the compressor while dispersing frequency at which the peak of noise appears.

Figure 9:
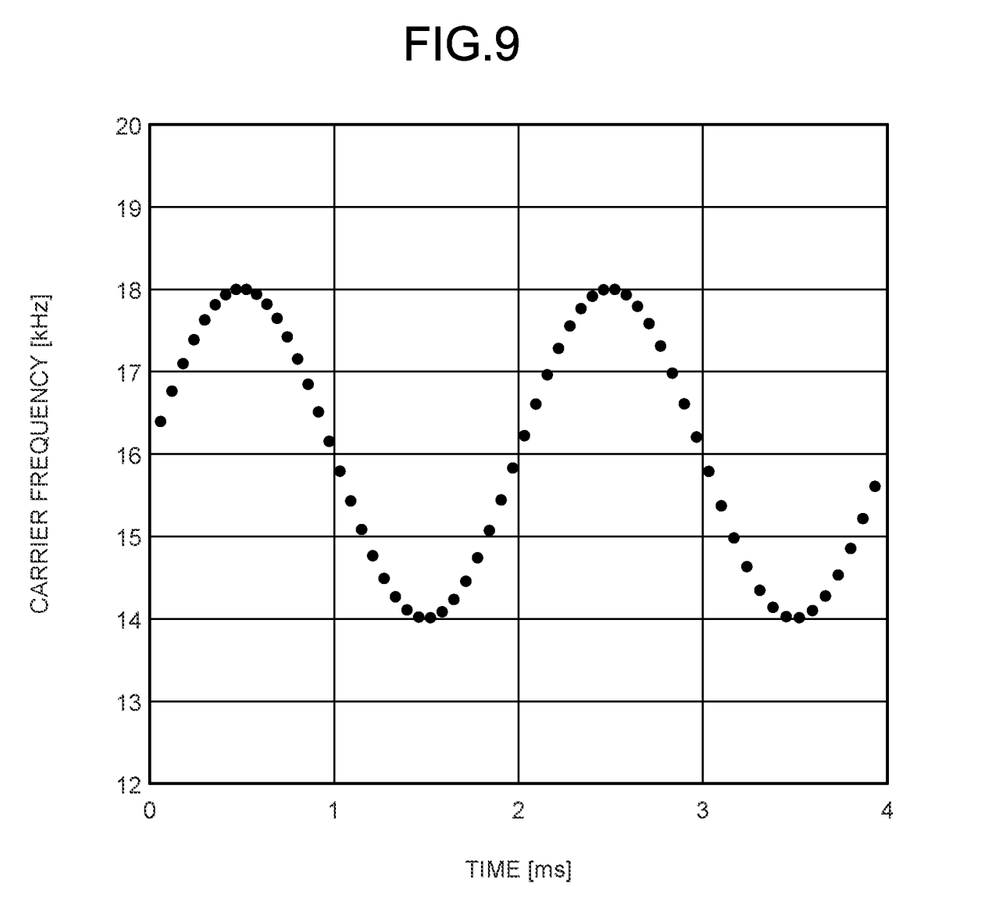
FIG. 9 is a diagram illustrating a modulation frequency according to the first embodiment.

In addition, it is possible to allocate changes in the carrier frequency within a desired frequency range in a well-balanced manner and to further stabilize instantaneous power by modulating the variable frequency of the above-described carrier frequency by using a periodic function with a frequency lower than the carrier frequency. FIG. 9 is a diagram illustrating a modulation frequency according to the first embodiment. FIG. 9 illustrates an example in which the carrier frequency is changed in such a way as to form a sine wave of 500 Hz (period of 2 ms) on the assumption that the carrier frequency is variable in a range of 14 kHz to 18 kHz, centered on 16 kHz. In FIG. 9, the vertical axis represents carrier frequency, and the horizontal axis represents time. Note that the variable frequency range is not limited to the range of 14 kHz to 18 kHz. In addition, it is possible to take measures against noise without depending on measures against noise based on a hardware component such as a ferrite core by adjusting a frequency to be modulated in accordance with a difference in noise characteristics due to a combination of the motor 8 and the inverter 9 to be used and adjusting control parameters.

Second Embodiment

In the first embodiment, a description has been given of the case where V4 and V3 are voltage vectors to be applied when the carrier is variable in the heating control of the compressor 1 based on application of the high-frequency voltage and variable control of the carrier frequency. The heat pump apparatus 100 according to the present embodiment may perform control so as to avoid uneven heating by shifting the directions of voltage vectors by a desired angle with the lapse of a desired period of time from operation of alternately outputting the V4 vector and the V3 vector in the first embodiment, and shifting pairs of voltage vectors to be output alternately with opposite signs by 120° in the order of a pair of the vectors V4 and V3, a pair of the vectors V2 and V5, and then a pair of the vectors V1 and V6, as illustrated in FIG. 6. In addition, it goes without saying that the same effect can be obtained even in the case of performing control in such a way as to shift the voltage vectors by 60°.

Third Embodiment

Figure 10:
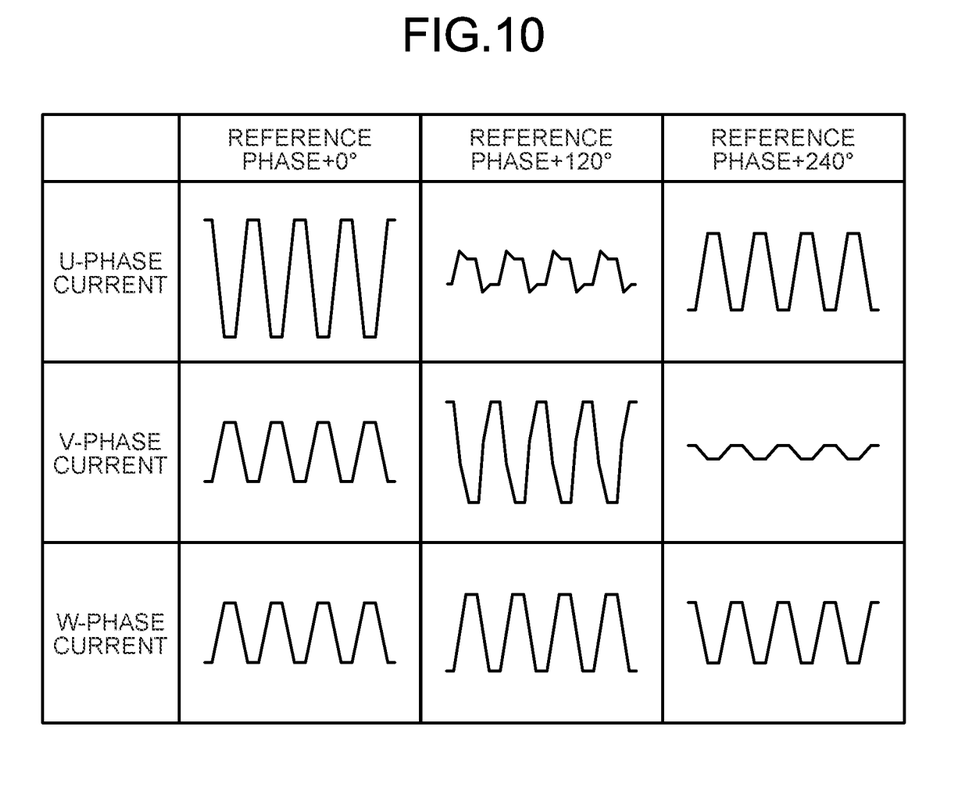
FIG. 10 is a diagram illustrating currents flowing in each of the U-phase, V-phase, and W-phase of a motor when a reference phase θf according to a third embodiment is 0°, 120°, and 240°.

FIG. 10 is a diagram illustrating currents flowing in each of the U-phase, V-phase, and W-phase of the motor 8 when a reference phase θf according to a third embodiment is 0°, 120°, and 240°. In the second embodiment, control is performed such that in the case where the directions of voltage vectors to be applied when the V4 vector and the V3 vector are alternately applied to the motor 8 are set to a reference phase of 0°, the directions of the voltage vectors are shifted by 120° and 240°. When the direction of the voltage vector is shifted, currents flowing in the U-phase, the V-phase, and the W-phase may change as illustrated in FIG. 10. In this case, as a result of the shifting of a direction in which the voltage vector is applied by 120° and 240° after the lapse of a desired period of time as described above, electrical noise also changes.

Figure 11:
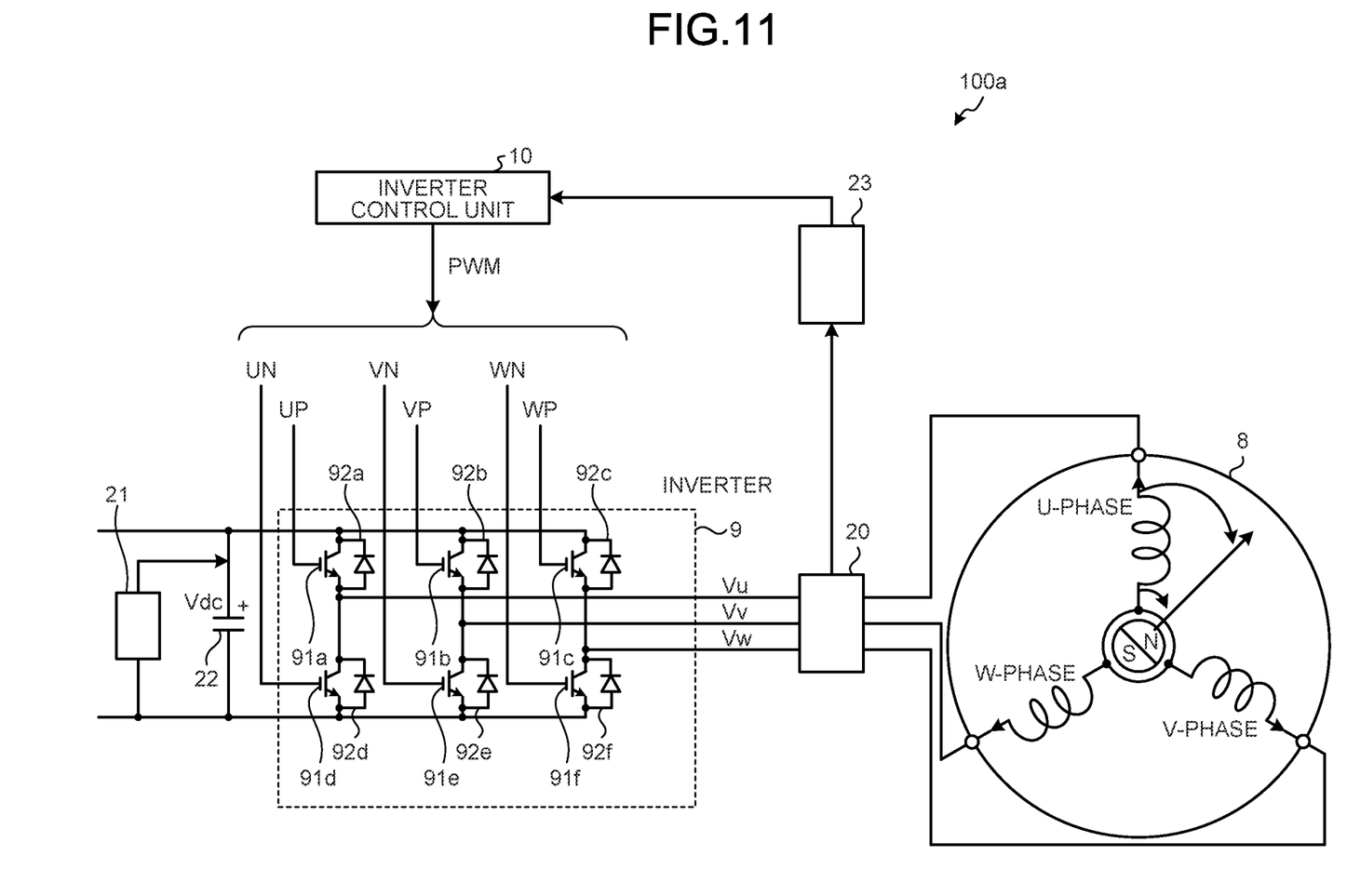
FIG. 11 is a diagram illustrating a part of a heat pump apparatus according to the third embodiment.

FIG. 11 is a diagram illustrating a part of a heat pump apparatus 100a according to the third embodiment. Only the inverter 9, the motor 8, and their surroundings are illustrated in FIG. 11. The heat pump apparatus 100a includes a current detection circuit 20, a voltage monitoring circuit 21, a main circuit capacitor 22, and a voltage calculation unit 23, in addition to the constituent elements of the heat pump apparatus 100. The current detection circuit 20 is provided between the inverter 9 and the motor 8. The main circuit capacitor 22 is a source of supply of voltage to the inverter. The voltage monitoring circuit 21 monitors the bus voltage Vdc of the main circuit capacitor 22. The voltage calculation unit 23 stores a current value detected by the current detection circuit 20, and calculates a voltage vector application time period or a voltage command value such that an equal current flows for each voltage vector.

When a reference phase is set to 0° at the start of a heating operation mode, the inverter 9 applies one or both of the V4 vector and the V3 vector to the motor 8. The current detection circuit 20 detects a current flowing through the U-phase winding of the motor 8. Next, the inverter 9 applies, to the motor 8, a voltage vector shifted by 120° from the reference phase. The current detection circuit 20 detects a current flowing in the V-phase. Next, the inverter 9 applies, to the motor 8, a voltage vector shifted by 240° from the reference phase. The current detection circuit 20 detects a current flowing in the W-phase. Values of the currents detected by the current detection circuit 20 are stored in the voltage calculation unit 23. In addition, the voltage calculation unit 23 calculates an actual voltage vector application time period or the voltage command value |V*| for each state such that equal currents flow for the reference phase of 0°, the reference phase of 120°, and the reference phase of 240°.

When Vdc denotes the bus voltage, Δt denotes a voltage vector application time period, ΔIu denotes a current to flow when the vector is shifted by 0° from the reference phase, Lu denotes inductance, ΔIv denotes a current to flow when the vector is shifted by 120° from the reference phase, Lv denotes inductance, Iw denotes a current to flow when the vector is shifted by 240° from the reference phase, and Lw denotes inductance, Lu can be expressed by equation (1).

$$Lu = Vdc \cdot \Delta t / \Delta Iu \tag{1}$$

In addition, the relationship between the inductance values of current paths for the respective phases is expressed by equation (2).

$$Lu \cdot \Delta Iu = Lv \cdot \Delta Iv = Lw \cdot \Delta Iw \tag{2}$$

By using equation (2), the voltage calculation unit 23 can calculate the actual voltage vector application time period for each phase such that current values for the respective phases of the voltage vector are equal, and calculates the relationship between the application time periods for the respective phases.

For example, in the case where the voltage vector application time period for alternately applying the V4 vector and the V3 vector with the reference phase of 0° is used as a basis, the application time periods with the reference phase of 120° and the reference phase of 240° are respectively expressed by equations (3) and (4), where Δtu denotes the application time period with the reference phase of 0°, Δtv denotes the application time period with the reference phase of 120°, and Δtw denotes the application time period with the reference phase of 240°.

$$\Delta tv = (Lu/Lv) \cdot \Delta tu \tag{3}$$

$$\Delta tw = (Lu/LV) \cdot \Delta tu \tag{4}$$

From equations (2), (3), and (4), the voltage calculation unit 23 can obtain the actual voltage vector application time period in each phase such that the output current of the inverter is constant regardless of the phase of the voltage vector after the lapse of a desired period of time. The carrier frequency variable control is performed such that the actual voltage vector application time period is kept at a constant value of Δtu when the vector is shifted by 0° from the reference phase. The carrier frequency variable control is performed such that the actual voltage vector application time period is kept at a constant value of Δtv in equation (3) when the vector is shifted by 120° after the lapse of the desired period of time. In addition, the carrier frequency variable control is performed such that the actual voltage vector application time period is kept at a constant value of Δtw in equation (4) when the vector is shifted by 240° after the lapse of the desired period of time.

Figure 12:
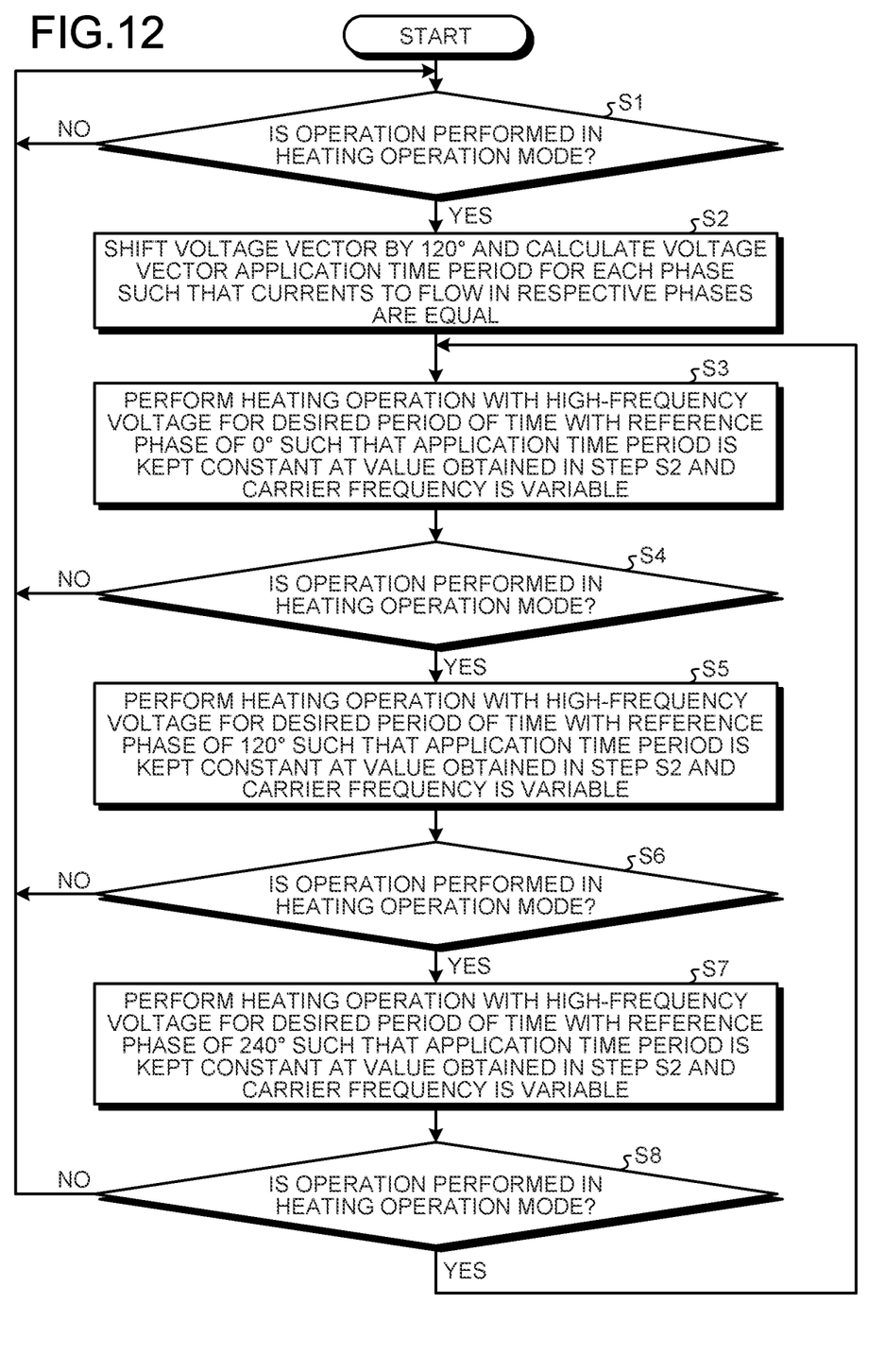
FIG. 12 is a flowchart illustrating operation of a voltage calculation unit according to the third embodiment.

FIG. 12 is a flowchart illustrating operation of the voltage calculation unit 23 according to the third embodiment. The voltage calculation unit 23 checks whether the heat pump apparatus 100a is in the heating operation mode on the basis of operation mode information held by the inverter control unit 10 (step S1). When the heat pump apparatus 100a is in the heating operation mode (step S1, Yes), the voltage calculation unit 23 shifts the voltage vector by 120°, detects a current value in each phase, and calculates a voltage vector application time period for each phase such that currents to flow in the respective phases are equal (step S2). When the heat pump apparatus 100a is not in the heating operation mode (step S1, No), the process returns to step S1. The voltage calculation unit 23 performs heating operation with a high-frequency voltage for a desired period of time with the reference phase of 0° such that the application time period is kept constant at the value obtained in step S2 and the carrier frequency is variable (step S3). The voltage calculation unit 23 checks whether the heat pump apparatus 100a is in the heating operation mode on the basis of the operation mode information held by the inverter control unit 10 (step S4). When the heat pump apparatus 100a is in the heating operation mode (step S4, Yes), the voltage calculation unit 23 performs heating operation with the high-frequency voltage for a desired period of time with the reference phase of 120° such that the application time period is kept constant at the value obtained in step S2 and the carrier frequency is variable (step S5). When the heat pump apparatus 100a is not in the heating operation mode (step S4, No), the process returns to step S1.

The voltage calculation unit 23 checks whether the heat pump apparatus 100a is in the heating operation mode on the basis of the operation mode information held by the inverter control unit 10 (step S6). When the heat pump apparatus 100*a* is in the heating operation mode (step S6, Yes), the voltage calculation unit 23 performs heating operation with the high-frequency voltage for a desired period of time with the reference phase of 240° such that the application time period is kept constant at the value obtained in step S2 and the carrier frequency is variable (step S7). When the heat pump apparatus 100*a* is not in the heating operation mode (step S6, No), the process returns to step S1. The voltage calculation unit 23 checks whether the heat pump apparatus 100*a* is in the heating operation mode on the basis of the operation mode information held by the inverter control unit 10 (step S8). When the heat pump apparatus 100*a* is in the heating operation mode (step S8, Yes), the process returns to step S3. When the heat pump apparatus 100*a* is not in the heating operation mode (step S8, No), the process returns to step S1.

The current detection circuit 20, which is an inverter output current detection circuit, can detect current even in the case of three phases of the U-phase, the V-phase, and the W-phase or two phases. In the case of two phases, for example, when there is no current detection circuit for the V-phase, a current flowing in the V-phase at an angle of 120° can be obtained as the sum of currents flowing in the U-phase and the W-phase. Furthermore, the same applies to the case where there is no current detection circuit for the U-phase and the case where there is no current detection circuit for the W-phase.

The third embodiment is effective from the viewpoint of uniformly heating the compressor as in the second embodiment, and is also effective from the viewpoint of electrical noise characteristics. If the current input to the compressor changes depending on the phase of the voltage vector, the noise characteristics for heating change every time the phase is switched. However, the invention of the third embodiment enables the compressor to be uniformly heated. Furthermore, it is possible to achieve an improvement in electrical noise characteristics for heating operation of the compressor with high-frequency voltage, in addition to the effect of noise reduction based on the carrier frequency variable control described in the first embodiment. It goes without saying that noise is also improved.

In addition, nowadays, semiconductors made of silicon (Si) are generally used for the switching elements 91*a* to 91*f* included in the inverter 9 and the freewheeling diodes 92*a* to 92*f* connected in parallel to the switching elements 91*a* to 91*f*. However, wide bandgap semiconductors made of silicon carbide (SiC), gallium nitride (GaN), or diamond may be used in place of semiconductors made of silicon. Furthermore, wide bandgap semiconductors may be used for the switching elements 91*a* to 91*f* included in the inverter 9 and the freewheeling diodes 92*a* to 92*f* connected in parallel to the switching elements 91*a* to 91*f*, also in the first and second embodiments Furthermore, switching elements and diode elements formed of such wide bandgap semiconductors have high voltage endurance and high allowable current density. Therefore, switching elements and diode elements can be miniaturized, and use of such miniaturized switching elements and diode elements enables miniaturization of a semiconductor module, that is, the inverter 9 in which these miniaturized elements are incorporated.

Furthermore, switching elements and diode elements formed of such wide bandgap semiconductors also have high heat resistance. Therefore, radiating fins of a heat sink can be miniaturized and a water-cooling unit can be air-cooled, so that the semiconductor module can be further miniaturized.

Moreover, switching elements and diode elements formed of such wide bandgap semiconductors are low in power loss. Therefore, the efficiency of the switching elements or the diode elements can be increased, so that the efficiency of the semiconductor module can be increased.

In addition, since switching can be performed at a high frequency, it is possible to pass a higher-frequency current through the motor 8, so that current flowing through the inverter 9 can be reduced by a reduction in winding current due to an increase in the winding impedance of the motor 8. As a result, a more efficient heat pump apparatus can be obtained. Furthermore, frequency can be easily increased. This offers an advantage in that it is easy to set a frequency exceeding an audible frequency and it is thus easy to take measures against noise. Moreover, since power loss is also reduced in DC energization, heat generation is reduced. In addition, heat resistance performance is high even if a large current flows. This offers an advantage in that, for example, breakage is less likely to be caused by heat generation.

Note that, in the first to third embodiments, it is desirable for both the switching elements and the diode elements to be formed of wide bandgap semiconductors, but as long as either the switching elements or the diode elements are formed of wide bandgap semiconductors, the effects described in the embodiments can be achieved. Alternatively, in the first to third embodiments, it is also possible to achieve the same effects by using a metal-oxide-semiconductor field-effect transistor (MOSFET) having a super junction structure, known as a highly efficient switching element.

The configurations set forth in the above embodiments show examples of the subject matter of the present invention, and it is possible to combine the configurations with another technique that is publicly known, and is also possible to make omissions and changes to part of the configurations without departing from the gist of the present invention.

The invention claimed is:

1. A heat pump apparatus comprising:
   a compression mechanism to compress a refrigerant;
   a motor to drive the compression mechanism;
   an inverter to apply a voltage to the motor; and
   an inverter control circuitry to generate a drive signal for driving the inverter, based on a carrier signal,
   wherein the inverter control circuitry
      periodically changes a carrier frequency of the carrier signal in a heating operation mode in which the refrigerant is heated, and
      generates the drive signal such that a period of time during which a voltage represented as a real vector is applied to the motor is kept constant regardless of the changed carrier frequency.

2. The heat pump apparatus according to claim 1, wherein the inverter control circuitry changes the carrier frequency by changing an amplitude value of the carrier signal without changing a gradient of the carrier signal.

3. The heat pump apparatus according to claim 1, wherein the inverter control circuitry changes the carrier frequency by changing a gradient of the carrier signal.

4. The heat pump apparatus according to claim 2,
wherein at a timing of a peak and a valley of the carrier signal, the inverter control circuitry switches a voltage command value such that a voltage to be applied to the motor is alternately set to
 a first voltage command value with a phase difference of 0° with respect to a reference phase and
 a second voltage command value with a phase difference of 180° with respect to the reference phase,
 the voltage command value being for changing the voltage to be applied to the motor.

5. The heat pump apparatus according to claim 4, wherein the inverter control circuitry
 changes a center value of an amplitude of the carrier signal such that a change in the center value follows a change in an amplitude value of the carrier signal every time the carrier frequency is changed,
 sets the changed center value of the amplitude of the carrier signal as a basis for the first voltage command value and the second voltage command value, and
 keeps a value of difference between the first voltage command value and the basis and a value of difference between the second voltage command value and the basis constant for each of carrier signals with different frequencies.

6. The heat pump apparatus according to claim 4,
wherein the inverter control circuitry switches between windings of the motor for respective phases so as to switch a phase in which current is concentrated to another phase, by switching the reference phase such that the reference phase is shifted by 120° at every desired time cycle.

7. The heat pump apparatus according to claim 4,
further comprising:
 a current detection circuit to detect a current of each phase of the inverter; and
 a voltage calculation circuitry to store a current value detected by the current detection circuit, and calculate the voltage command value by using the current value,
wherein the voltage command value is calculated such that a value of the current of each phase of the inverter is kept at any given constant value, the current flowing when the voltage is applied.

8. The heat pump apparatus according to claim 7,
wherein
 a period of time during which the voltage is applied to the motor is determined such that the value of the current of each phase of the inverter is kept constant, and
 a voltage with a phase difference of 0° or 180° with respect to the reference phase is alternately applied.

9. The heat pump apparatus according to claim 1,
wherein a switching element included in the inverter is a wide bandgap semiconductor.

10. The heat pump apparatus according to claim 1,
wherein a diode included in the inverter is a wide bandgap semiconductor.

11. The heat pump apparatus according to claim 9,
wherein the wide bandgap semiconductor is any one of silicon carbide, a gallium nitride-based material, and diamond.

12. The heat pump apparatus according to claim 1,
wherein a switching element included in the inverter is a metal-oxide-semiconductor field-effect transistor having a super junction structure.

13. The heat pump apparatus according to claim 10,
wherein the wide bandgap semiconductor is any one of silicon carbide, a gallium nitride-based material, and diamond.

14. An air conditioner comprising
a heat pump apparatus further comprising:
a compression mechanism to compress a refrigerant;
a motor to drive the compression mechanism;
an inverter to apply a voltage to the motor; and
an inverter control circuitry to generate a drive signal for driving the inverter, based on a carrier signal,
wherein the inverter control circuitry
 periodically changes a carrier frequency of the carrier signal in a heating operation mode in which the refrigerant is heated, and
 generates the drive signal such that a period of time during which a voltage represented as a real vector is applied to the motor is kept constant regardless of the changed carrier frequency.

15. A refrigerator comprising
a heat pump apparatus further comprising:
a compression mechanism to compress a refrigerant;
a motor to drive the compression mechanism;
an inverter to apply a voltage to the motor; and
an inverter control circuitry to generate a drive signal for driving the inverter, based on a carrier signal,
wherein the inverter control circuitry
 periodically changes a carrier frequency of the carrier signal in a heating operation mode in which the refrigerant is heated, and
 generates the drive signal such that a period of time during which a voltage represented as a real vector is applied to the motor is kept constant regardless of the changed carrier frequency.

* * * * *